United States Patent [19]
Rosán, Sr.

[11] 3,726,180
[45] Apr. 10, 1973

[54] INSERT WITH CHIP ENTRAPMENT MEANS

[76] Inventor: José Rosán, Sr., Rancho San Juan, San Juan Capastrano, Calif. 12675

[22] Filed: July 26, 1972

[21] Appl. No.: 275,429

Related U.S. Application Data

[63] Continuation of Ser. No. 117,083, Feb. 19, 1971, abandoned.

[52] U.S. Cl. .................................................. 85/46
[51] Int. Cl. ............................................ F16b 33/02
[58] Field of Search ................ 85/41, 46, 47, 1 P

[56] References Cited

UNITED STATES PATENTS

| | | | |
|---|---|---|---|
| 1,980,093 | 11/1934 | Rosenberg | 85/46 |
| 2,167,559 | 7/1939 | Upson | 85/46 |
| 2,419,555 | 4/1947 | Fator | 85/46 |
| 3,094,894 | 6/1963 | Broberg | 85/47 |

FOREIGN PATENTS OR APPLICATIONS

| | | | |
|---|---|---|---|
| 896,595 | 5/1963 | Great Britain | 85/47 |

*Primary Examiner*—Marion Parsons, Jr.
*Attorney*—Roman A. DiMeo

[57] ABSTRACT

The invention herein disclosed is a self-tapping threaded fastener provided with forming threads, the external diameters of which progressively uniformly reduce to join a retainer means comprised of an outwardly protruding pilot means and the lead thread of the forming threads so as to provide an annular groove means having a constant axial height for capturing and maintaining the severed workpiece material resulting from the tapping operation of said forming threads.

10 Claims, 4 Drawing Figures

PATENTED APR 10 1973 3,726,180

INVENTOR
JOSÉ ROSÁN, SR.

BY
*Roman Q. Ditmo*

ATTORNEY

INSERT WITH CHIP ENTRAPMENT MEANS

This application is a continuation of my copending application Ser. No. 117,083, filed Feb. 19, 1971, and now abandoned.

Heretofore, self-tapping fasteners for simultaneously providing threads and threading the fastener into a drilled bore in a workpiece were generally undesirable in that the severed workpiece material or debris resulting from the tapping operation would fall into the drilled workpiece bore detrimentally affecting the workpiece or its associated members where said bore was not a "blind" bore by causing jamming and/or friction wear when lodged between interfaces of moving parts.

This problem is eliminated by the self-tapping fastener of the instant invention by an annular, nonhelical chip retainer groove having a constant axial height situated immediately forward of the lead thread of the forming thread and an annular pilot flange preceding the groove. The chip retainer means described may be utilized with fully configured forming threads or truncated forming threads without deviating from the scope of the invention herein.

The pilot flange, being the approximate diameter of the drilled workpiece hole (prior to tapping), serves three functions. It guides the fastener in substantially axial alignment with the drilled hole, provides a barrier which prohibits passage of any severed material forward thereof, and forms with the upper face thereof, the lower wall of the chip retainer groove. It should be noted that the maximum diameter of the pilot flange does not exceed the minimum diameter of the lead thread, otherwise the forming effect of said lead thread would be diminished if not completely eliminated.

Accordingly, the primary object of the invention is to provide a simple and inexpensive self-tapping fastener having a retaining means for entrapping loose workpiece material and other debris resulting from the tapping operation.

Another object is to provide a simple and inexpensive self-tapping fastener wherein the diameters of the forming threads are progressively reduced to provide a conical configuration of uniform taper at the forming end of the fastener.

Other objects and advantages will be readily apparent from the following description taken in conjunction with the accompanying drawings, in which.

Figure 1:
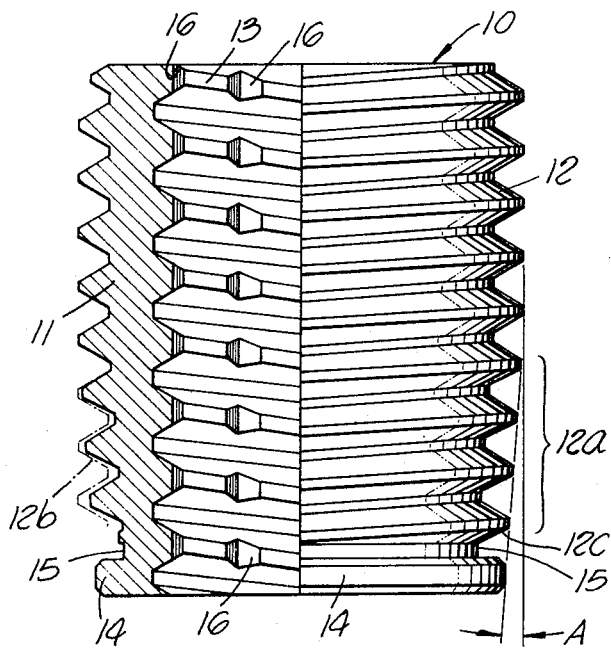
FIG. 1 is an elevational, partly sectioned view of the self-tapping fastener embodying the principles of the invention.
Figure 2:
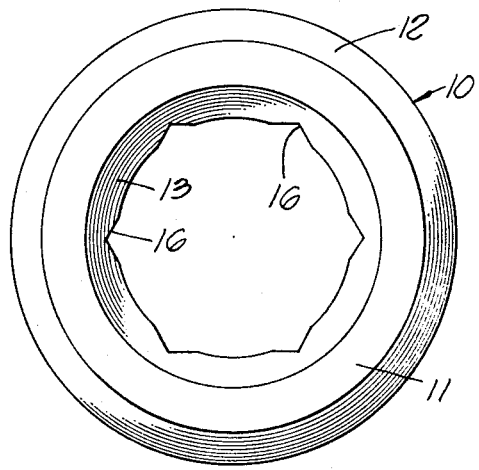
FIG. 2 is a top plan view of the fastener illustrated in FIG. 1.
Figure 3:
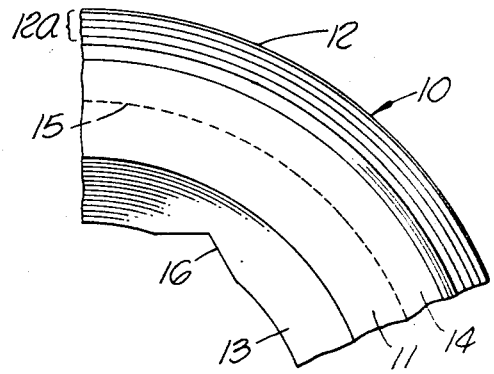
FIG. 3 is a bottom plan view of the fastener illustrated in FIG. 1.

Referring more particularly to FIGS. 1-3, reference numeral 10 designates generally the self-tapping fastener of the invention which is provided with a body 11 and external thread convolutions 12. It is understood that although fastener 10 is shown as a hollow insert having an internally threaded bore 13, said fastener may be solid and be provided with an axially extending threaded protrusion, i.e., a stud, without deviating from the scope of the invention.

A portion of thread convolutions 12 are uniformly reduced in diameter to provide forming threads 12a whereby the crests thereof lie in a conical plane which deviates from the cylindrical plane passing through the crests of the other thread convolutions 12 in an amount designated by Angle A. Although the taper of the conical plane relative to the cylindrical plane can be of any angle without deviating from the scope of the invention herein, it was found that a range of 3° to 10° was acceptable, but that optimum tapping results were obtained with an angle deviation of approximately 5°. In the embodiment illustrated in FIG. 1, the diameter of the roots of the forming threads also are progressively uniformly reduced in diameter. Thus, it should be noted that although the crests and roots of forming portion 12a uniformly deviate from the other thread convolutions, such as at 12b, the thread forms of forming threads 12a are uniform and are also similar to the thread forms of the other thread convolutions 12.

Pilot means 14 is provided by fastener 10 forwardly of forming threads 12a in longitudinal spatial relationship therewith. Pilot means 14 is comprised of a continuous annular flange which has a diameter only slightly less than that of the workpiece bore so as to be snugly associated therewith, thereby resulting in a means to not only guide the insert into the workpiece bore during the tapping operation, but also provides a cap at the forward end of the fastener to seal the workpiece bore from the fastener for reasons which will hereinafter be more fully explained. Again, it should be noted that although the diameter of pilot means 14 is greater than the root diameters of forming threads 12a and thread convolutions 12, the aforesaid diameter of the pilot means is less than the minimum diameter of the crest of the lead thread 12c of the fastener so as to enhance the tapping function of the forming threads.

Situated between the lead thread 12c and pilot means 14 is an annular groove 15 which is formed by the bottom surface and the top surface of said lead thread 12c and pilot means 14, respectively. Groove 15 has a constant axial height and is positioned forward of lead thread 12c and rearward of pilot means 14 so that as workpiece material or debris is loosened during the tapping operation, it is captured and retained within groove 15. Thus, since as aforesaid, the maximum diameter of pilot flange 14 is only slightly less than the minimum diameter of the workpiece bore in which it is inserted, and a fortiori, the root and crest diameter of forming threads 12a are equal to, or slightly less, than the crest and root diameters, respectively, of the threads formed in the workpiece bore, the workpiece material or debris must of necessity be directed to and entrapped in groove 15 thereby prohibiting passage of the aforesaid loosened material or debris either forward of pilot means 14, or rearward of the point where forming threads 12 commence to uniformly reduce in diameter.

Although fastener 10 is shown as being provided with longitudinally extending grooves 16 which intersect the crests of the threads of the internal bore for engagement by a cooperating tool for installing the insert, other means, particularly with regard to stud fasteners, may be utilized to install the insert without deviating from the invention herein, provided sufficient drive force can be imparted to the fastener to perform the thread forming operating during the installation thereof.

Figure 4:
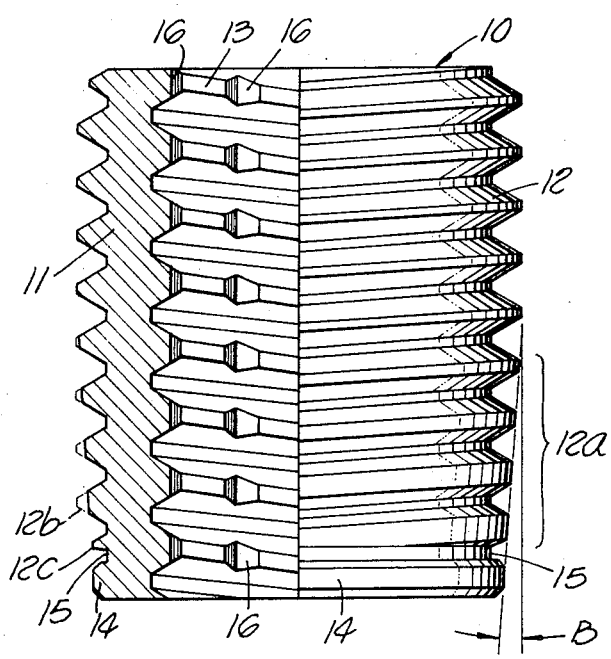
FIG. 4 is an elevational, partly sectioned view of another embodiment of the self-tapping fastener of the invention wherein the thread forms of the forming threads are truncated and of progressively uniformly reduced height.

FIG. 4 discloses another embodiment of the fastener of the invention wherein the forming thread portion 12a of thread convolutions 12 is comprised of truncated thread forms which progressively, uniformly decrease in diameter approaching the forward or pilot means end of the fastener. In this embodiment, the root diameters of the thread convolutions 12 and thread forming portions 12a are uniform throughout. Nevertheless, the maximum diameters of the truncated crests of the thread forming portion 12a of the fastener lie in a conical plane which deviates from a cylindrical plane passing longitudinally through the crests of thread convolutions 12 by an angle B. Again, although angle B can be of any size without deviating from the scope of the invention herein, a range of 3° to 10° is acceptable, but the optimum performance angle was found to be approximately 5°. All other elements of the embodiment of FIG. 4 are similar in formation and relationship to the embodiment of FIG. 1 and accordingly are designated by similar reference numerals.

While several embodiments of the invention have been described, it is understood that the particular embodiments of the invention herein disclosed are for illustrative purposes only.

I claim:

1. A self-tapping fastener having chip entrapping means for installation in a workpiece bore, comprising:

a cylindrical body, said body provided with external thread convolutions, a portion of said thread convolutions progressively diminishing in diameter towards the lead thread so that the outer peripheries thereof lie in a uniformly inwardly tapering plane;

a circumferentially continuous annular pilot flange radially projecting from said body positioned forward of the lead thread of said thread convolutions and longitudinally spaced therefrom, said pilot flange having a diameter slightly less than that of said bore and less than the crest diameter of the lead thread convolution;

an annular chip entrapment groove situated between said lead thread and said pilot flange, said groove being defined by the upper face of said pilot flange and the lower face of said lead thread convolution and has a constant axial height, said groove spatially separating said pilot flange and said lead thread; and means for driving said fastener into a workpiece bore.

2. A self-tapping fastener as described in claim 1, wherein the thread convolutions having progressively diminishing diameters have full thread form configurations.

3. A self-tapping fastener as described in claim 2, wherein the root diameters of the thread convolutions having progressively diminishing diameters are progressively diminishing.

4. A self-tapping fastener as described in claim 3, wherein the taper of the conical surface generated by the thread convolutions progressively diminishing in diameter is in the range of 3° to 10°.

5. A self-tapping fastener as described in claim 4, wherein the wall of the base of the chip entrapment groove is formed by the body of the fastener and the radial diameter of said groove at the base thereof is less than the root diameter of the lead thread convolution.

6. A self-tapping fastener as described in claim 5, wherein the chip entrapment groove lies in a nonhelical plane.

7. A self-trapping fastener as described in claim 1, wherein the thread convolutions having progressively diminishing diameters have truncated thread form configurations.

8. A self-tapping fastener as described in claim 7, wherein the root diameters of the thread convolutions having progressively diminishing diameters are uniform with the root diameters of the other thread convolutions of the fastener.

9. A self-tapping fastener as described in claim 8, wherein the taper of the conical surface generated by the thread convolutions progressively diminishing in diameter is in the range of 3° to 10°.

10. A self-tapping fastener as described in claim 9, wherein the chip entrapment groove lies in a nonhelical plane.

* * * * *